Figure 1:
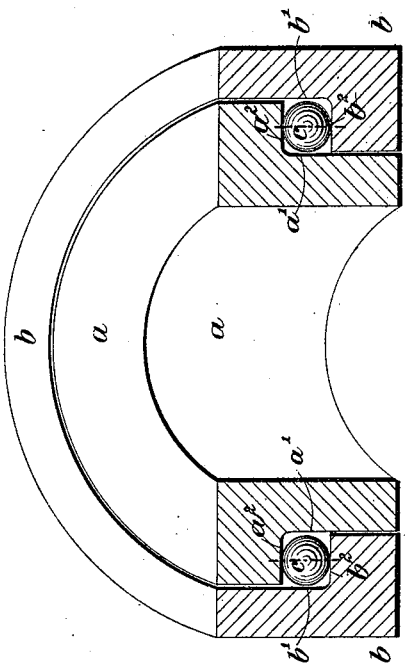

(No Model.) 5 Sheets—Sheet 1.

G. F. SIMONDS.
BALL BEARING.

No. 434,472. Patented Aug. 19, 1890.

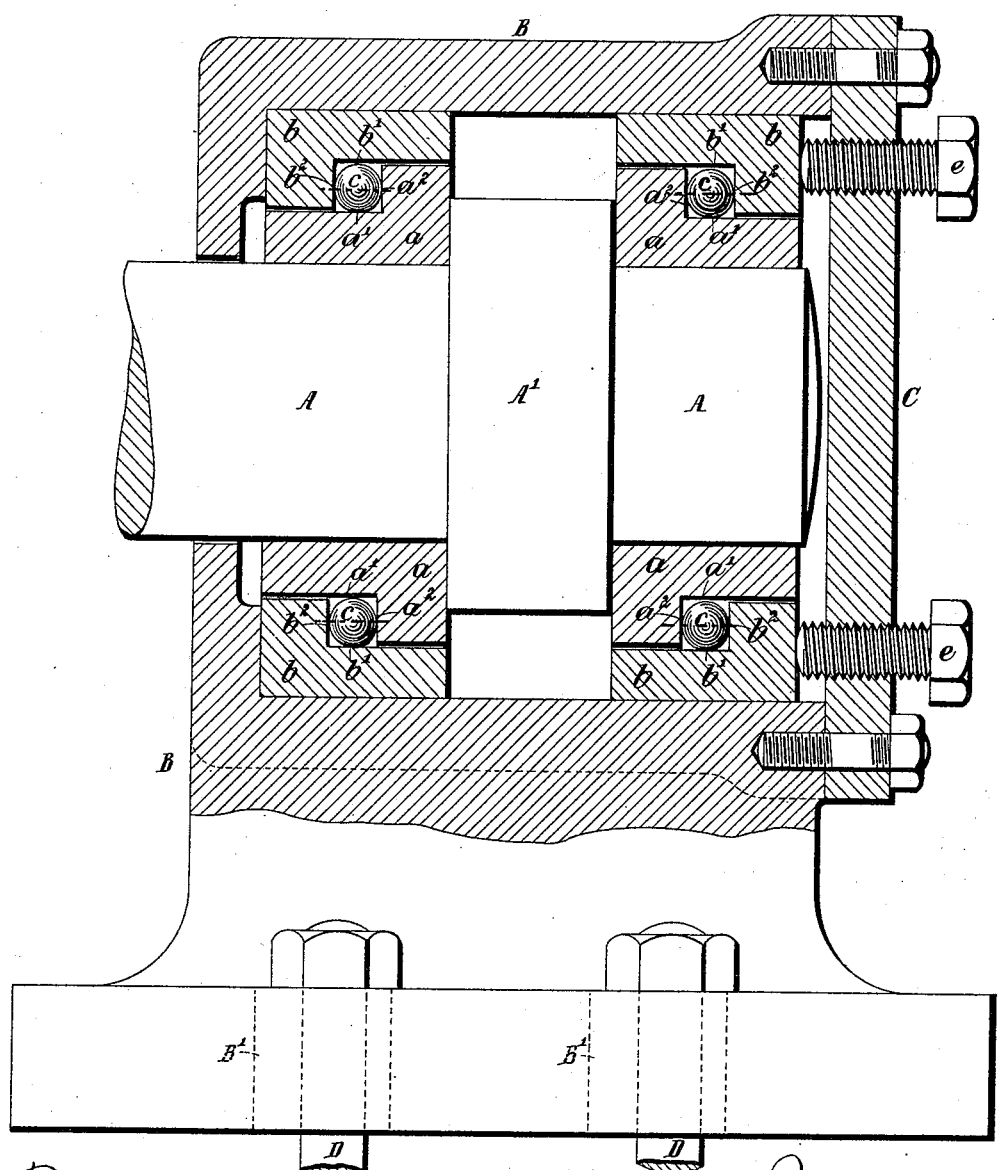

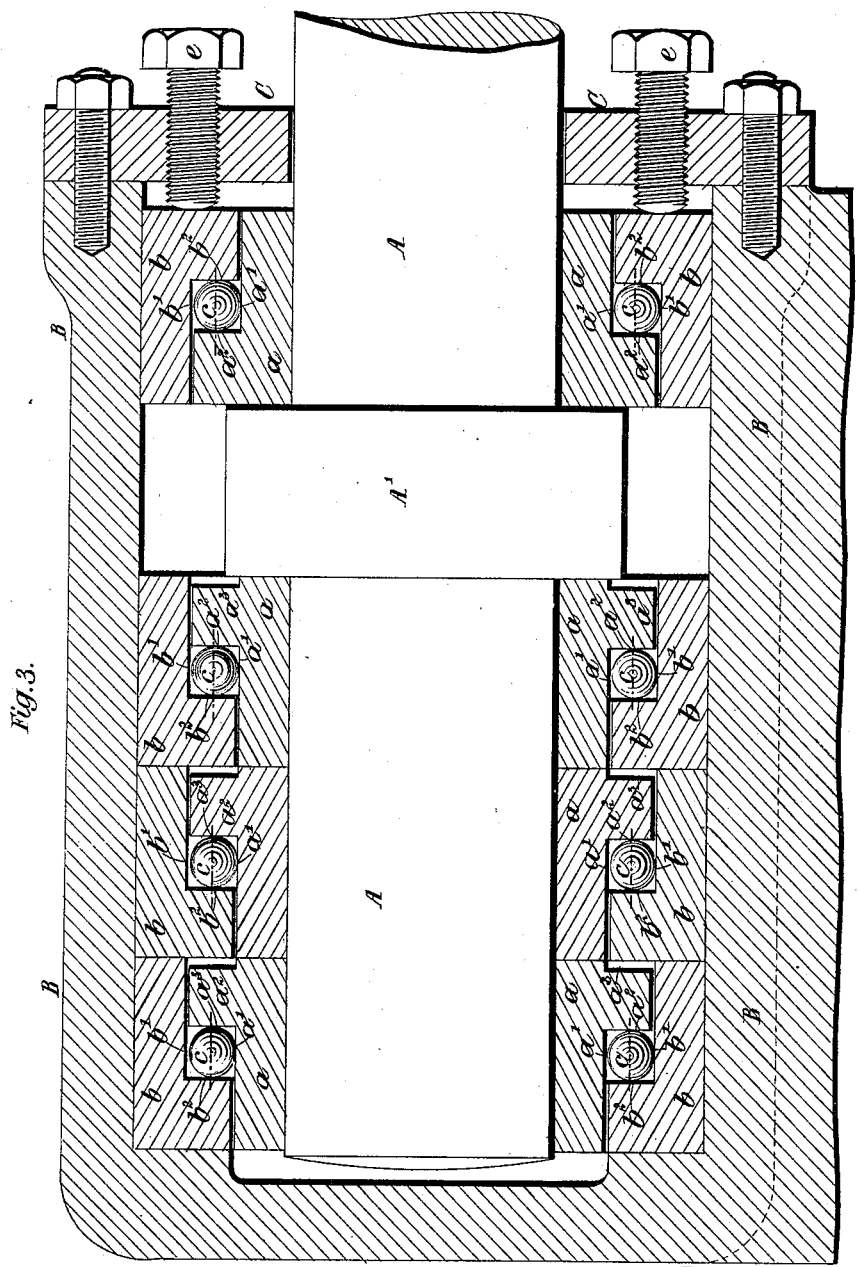

(No Model.) 5 Sheets—Sheet 4.
G. F. SIMONDS.
BALL BEARING.
No. 434,472. Patented Aug. 19, 1890.
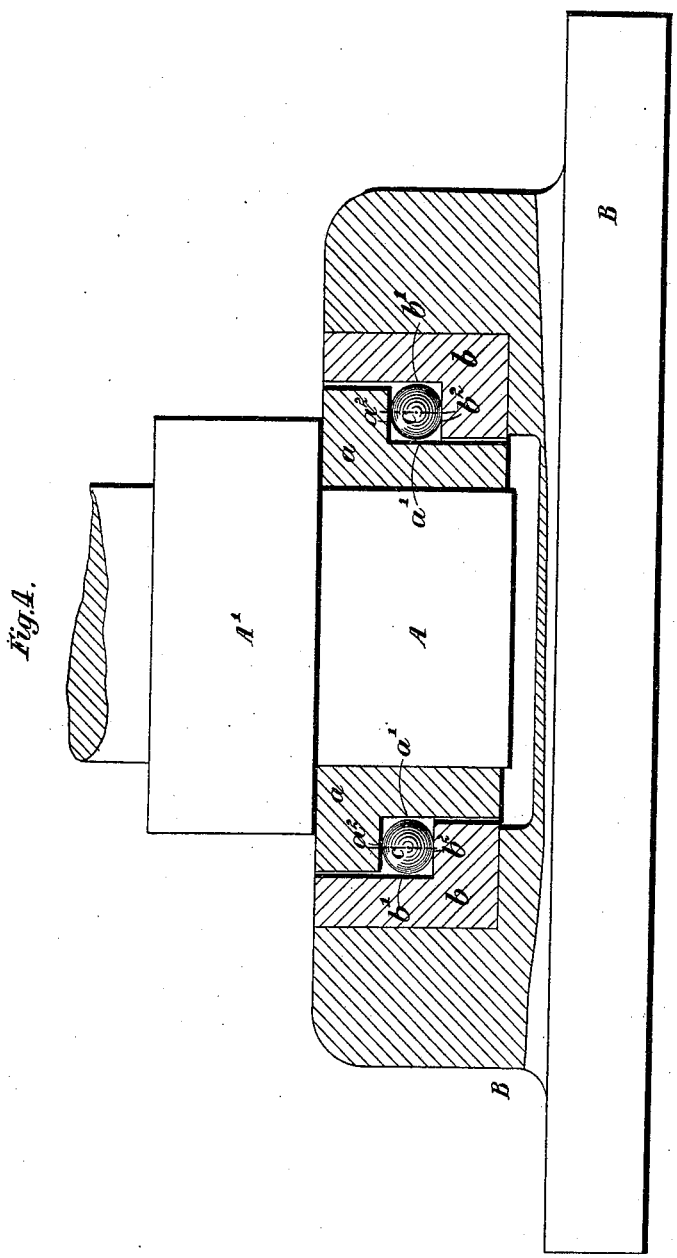

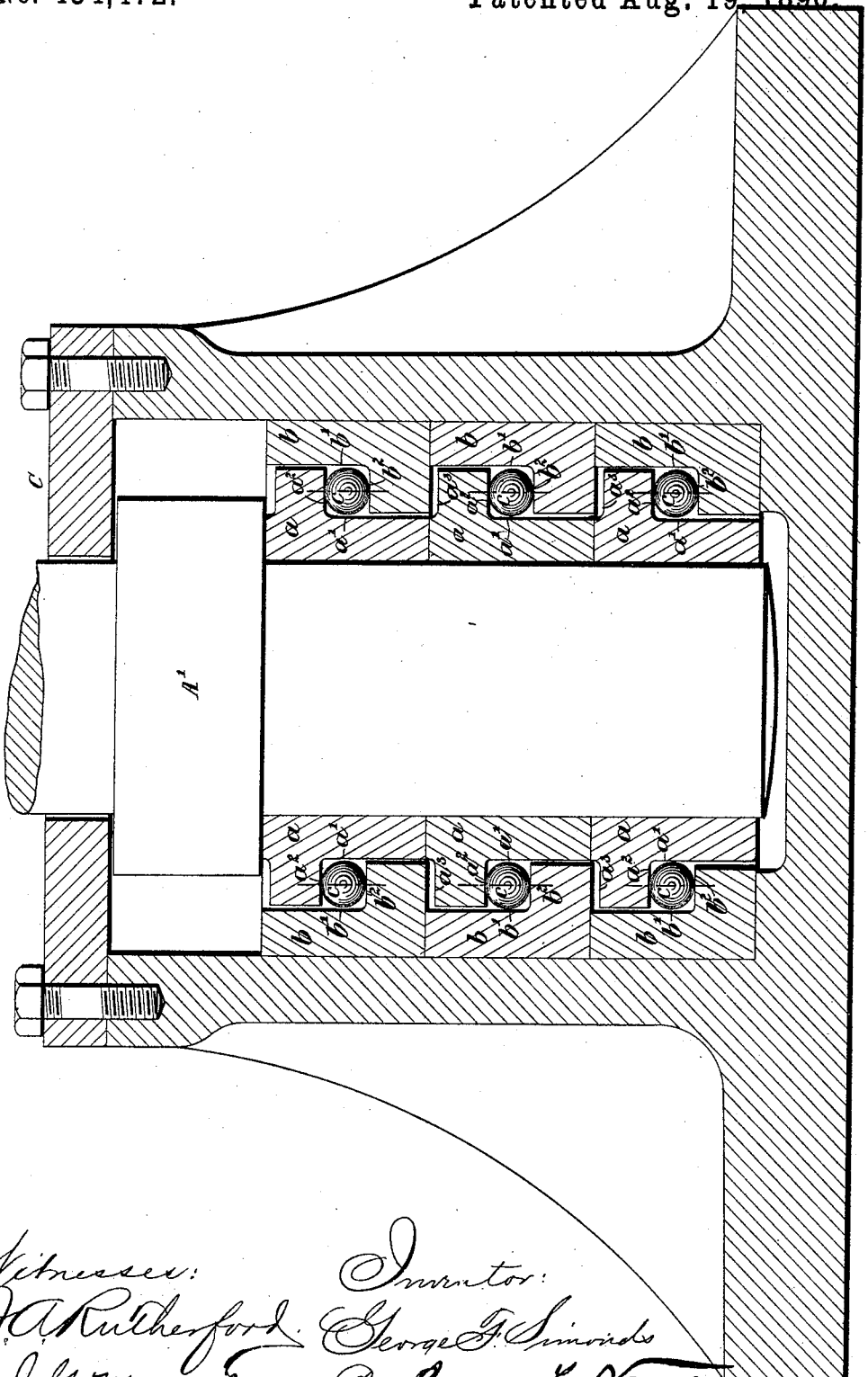

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,472, dated August 19, 1890.

Application filed November 26, 1889. Serial No. 331,639. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to bearings in which circular series or groups of spherical rollers or balls are employed to diminish the friction.

The main object of my said invention is to provide a very efficient and serviceable thrust or end-pressure ball-bearing. My improvements are, however, applicable to ball-bearings for supporting shafts or axles, turn-tables, and other revolving parts of machinery.

The essential feature of my said invention is the combination of removable inner and outer rings or annular pieces of steel or other suitable material, between which are placed spherical rollers, or balls, and which are provided with bearing-surfaces for the balls and with other surfaces which retain the balls in place, but do not serve as bearing-surfaces. The said rings or annular pieces are so shaped that when put together there is between the said rings an annular channel or cavity for the said rollers or balls—that is to say, the balls are arranged in a channel or cavity formed by two concentric surfaces and two plane surfaces parallel to each other and perpendicular to the said concentric surfaces, and each ring has formed thereon one of the said concentric surfaces and one of the said plane surfaces. One of the pair of rings or annular pieces is fixed upon the shaft or other rotating body, while the other ring or annular piece is located in or upon a suitable stationary support. Either the concentric or the plane surfaces may be used as the bearing-surfaces. By constructing a ball-bearing in this manner I am enabled to conveniently and effectually harden or temper and finish the bearing-surfaces before the parts of the bearing are put together. Moreover, the parts of the bearing can be very readily put together and taken apart when required, and several pairs of rings with balls between the rings of each pair may be arranged side by side or one above another in a thrust or other bearing.

My invention affords the further advantage that I am enabled to construct bearings in such a manner as to effectually exclude dust and water.

When the bearing is designed to transmit or resist thrust or end-pressure, or to support a vertical shaft or other revolving piece of machinery, the balls are arranged to bear against and roll between the plane surfaces, the points of contact of each ball with the said plane surfaces being at equal distances from the center of the shaft or other rotating body, so that a straight line extending through the said points will be parallel to the axis of the said shaft or other body. It is obvious that when the parts are so arranged the balls will roll upon the bearing-surfaces with but little, if any, friction. The concentric surfaces in this case merely serve to retain the balls in place, and are arranged at such a distance apart as to permit the free rotation of the balls between them. When the bearing is intended for supporting the weight of a horizontal shaft or the like, the balls are arranged to bear against and roll between the said concentric surfaces, the plane surfaces serving to retain the balls in place.

My said invention moreover comprises the combination with the aforesaid rings or annular pieces, of means for adjusting one of the same relatively to the other to bring the balls to a bearing against the said parallel plane surfaces and to compensate, if necessary, for wear of the said balls and surfaces.

In the accompanying drawings, Figure 1 is a sectional perspective view showing a pair of rings combined with a circular series or group of balls according to my present invention. Fig. 2 is a vertical longitudinal central section showing a simple form of thrust-bearing constructed according to my present improvements. Fig. 3 is a vertical longitudinal central section showing another form or modification of my improved thrust-bearing. Fig. 4 is a side elevation, partly in vertical central section, showing a simple form of step-bearing constructed according to my present improvements; and Fig. 5 is a vertical central section showing another form or modification of my improved step-bearing.

*a b* are the inner and outer rings or annular pieces.

*c c* are the spherical rollers or balls, which are arranged in a circular series or group between the said rings. It will be seen that the metal forming these rings is L-shaped in transverse section, the inner ring having an external circular rib, flange, or projection, and the outer ring an internal circular rib, flange, or projection, and that the surface $a'$ of the ring $a$ is concentric with the surface $b'$ of the ring $b$, while the plane surfaces $a^2 b^2$ of the said rings are parallel to each other and perpendicular or at right angles to the said concentric surfaces. The balls $c$ in the bearings shown bear against the two plane surfaces $a^2 b^2$, and are held in place by the concentric surfaces $a' b'$, which are sufficiently far apart to permit the balls to work freely between them.

In the bearing shown in Fig. 2 two rings *a b*, with balls *c* between them, are arranged on each side of a collar A′ on the shaft A, the rings *a* being fixed upon the said shaft and the rings *b* being fitted into a box or casing B, which is closed by a cap or cover C, held in place by means of screw studs and nuts or in any other convenient manner. In the bearing shown in Fig. 3 three pairs of the said rings *a b*, with balls *c* between the rings of each pair, are arranged on one side of the collar A′, a single pair of the said rings, with balls between them, being arranged on the other side of the said collar.

To provide for the adjustment of the rings *b* relatively to the rings *a*, for the purposes above mentioned, I provide adjusting-screws *e*, which are passed through tapped holes in the cover C and bear against the adjacent ring *b*. It will be seen that by turning these screws all the rings *b* may be simultaneously adjusted relatively to the corresponding rings *a*, the balls on the right-hand side of the collar A′ being first brought to a bearing by the action of the screws *e*, and the box or casing B being then drawn toward the said screws, thus bringing to a bearing the balls on the left-hand side of the said collar A′.

In Fig. 2 the shaft A extends through a hole in the box or casing B. In Fig. 3 the said shaft extends through a hole in the cover C. The holes B′, Fig. 2, for the holding-down bolts D, should be elongated to permit a slight longitudinal movement of the box or casing B relatively to the shaft A to permit the adjustment of the ring or rings *b* on the left-hand side of the collar A′ in Fig. 2 or in Fig. 3.

In the step-bearing shown in Fig. 4 the inner ring *a* is fixed upon the shaft A beneath the collar A′, while the outer ring *b* is fitted in the box or casing B, which forms a strong support or base for the said bearing.

In Fig. 5 it will be seen that the rings *a* are arranged one above another, so that each ring rests upon the one next below it, the collar A′ resting upon the uppermost ring *a*, and that the rings *b* are similarly arranged, the lowermost ring *b* being supported by the box or casing B.

When two or more pairs of rings *a b* are arranged side by side, as in Fig. 3, or one above another, as in Fig. 5, I find it advantageous to make the rings *a* with recesses $a^3$, so that should the balls inserted be somewhat larger in diameter than those shown the said rings will adapt themselves thereto.

It is obvious that the form of the rings or annular pieces may, if desired, be somewhat modified, provided they are made with concentric surfaces and plane surfaces, arranged as herein described. Moreover, means other than those above described may be employed for adjusting the outer rings relatively to the inner rings. If it is desired that the concentric surfaces should serve as the bearing-surfaces in either or all of the pairs of rings employed in a bearing, it is only necessary to so construct and arrange the said rings that the concentric surfaces are a less distance and the plane surfaces a greater distance apart than is shown in the drawings.

Certain features of construction shown and described in this application, but not claimed herein, are shown, described, and claimed in an application, Serial No. 335,693, filed by me January 2, 1890.

Having now fully described the nature of my said invention and how the same is to be carried into effect, I wish it understood that I do not make any claim to a series of balls arranged between concentric and plane surfaces when such series of balls is arranged between surfaces formed on more than two rings or annular pieces, nor when the said surfaces are formed on the shaft or axle or on a part of a wheel or the like. In my improved bearing each circular series or group of balls is arranged between two rings, each of which has thereon one of the concentric and one of the plane surfaces, forming an annular space or channel for the balls, and these rings are formed separately from the parts between which the bearing is required.

What I claim is—

1. A ball-bearing comprising two rings or annular pieces adapted to be removably attached one to a rotating body and the other to the part in or upon which the said body rotates, said rings having surfaces concentric with each other and plane surfaces parallel to each other and at right angles to the concentric surfaces, and balls which are located in an annular space or channel between said concentric and plane surfaces and which bear at diametrically-opposite points against and roll upon one pair of such surfaces and are retained in place by the other pair thereof, substantially as and for the purposes set forth.

2. In a ball-bearing, the combination of a rotating body, a ring or annular piece detachably secured thereto and having a surface concentric therewith and a plane surface at right angles to the said concentric surface, a non-rotating body, a ring or annular piece detachably secured thereto, and having a surface concentric with the rotating body and a plane surface parallel to the plane surface of the other ring, and balls located between said rings to bear at diametrically-opposite points against and roll upon one pair of the said surfaces and which are retained in place by the other pair thereof, substantially as and for the purposes set forth.

3. In a ball-bearing, a pair of removable rings or annular pieces having between them an annular space or channel which is square in transverse section and which is formed by a pair of concentric surfaces and a pair of plane surfaces at right angles to the said concentric surfaces, the outer ring being adjustable upon the inner ring, and balls which are situated in the said channel and which bear at diametrically-opposite points against and roll upon one of the said pairs of surfaces, and are retained in place by the other pair thereof, substantially as and for the purposes set forth.

4. In a ball-bearing, the combination, with the rotating and non-rotating parts, of pairs of rings arranged side by side, the rings of each pair being detachably secured one to the rotating and the other to the non-rotating part, and each ring being L-shaped in cross-section and having a surface concentric with the rotating part and a plane surface at a right angle to such concentric surface, and balls located between the rings of each pair in an annular space or channel formed by the said concentric and plane surfaces thereof, substantially as and for the purposes set forth.

5. A bearing comprising an inner ring or annular piece provided with an external flange and fixed on a shaft at one side of a collar thereon, a similar ring or annular piece fixed on the said shaft at the other side of the said collar, outer rings or annular pieces each provided with an internal flange, and spherical rollers or balls arranged between the said inner and outer rings, substantially as and for the purposes above specified.

6. A bearing comprising an inner ring or annular piece provided with an external flange and fixed on a shaft at one side of a collar thereon, a similar ring or annular piece fixed on the said shaft at the other side of the said collar, outer rings or annular pieces each provided with an internal flange and adjustable longitudinally upon the corresponding inner ring, and means, substantially such as above described, for simultaneously adjusting the outer rings on both sides of the said collar, substantially as and for the purposes above specified.

7. The combination of the rings $a$, provided with the recesses $a^3$, the rings $b$, and the balls $c$, substantially as and for the purposes set forth.

8. The combination of the rings $a\ b$, provided with the concentric surfaces $a'\ b'$, and with the plane surfaces $a^2\ b^2$, the balls $c$, arranged between the said rings, the box or support B, and the adjusting-screws $e$, substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.